United States Patent
Thyssen et al.

(10) Patent No.: US 7,684,521 B2
(45) Date of Patent: Mar. 23, 2010

(54) APPARATUS AND METHOD FOR HYBRID DECODING

(75) Inventors: Jes Thyssen, Laguna Niguel, CA (US); Juin-Hwey Chen, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

(21) Appl. No.: 11/048,916

(22) Filed: Feb. 3, 2005

(65) Prior Publication Data

US 2005/0286657 A1    Dec. 29, 2005

Related U.S. Application Data

(60) Provisional application No. 60/541,258, filed on Feb. 4, 2004.

(51) Int. Cl.
*H04L 27/06* (2006.01)
*H03M 13/00* (2006.01)

(52) U.S. Cl. .................................. 375/340; 714/746

(58) Field of Classification Search ................ 375/316, 375/340, 341, 16, 259–265; 714/699, 746, 714/786, 795, 798–801; 704/200, 231, 236, 704/242

See application file for complete search history.

(56) References Cited

U.S. PATENT DOCUMENTS

| 5,905,742 | A | * | 5/1999 | Chennakeshu et al. ...... 714/792 |
| 5,907,586 | A | * | 5/1999 | Katsuragawa et al. ....... 375/341 |
| 6,084,926 | A | * | 7/2000 | Zak et al. .................... 375/341 |
| 6,359,934 | B1 | * | 3/2002 | Yoshida ....................... 375/262 |
| 6,574,291 | B2 | * | 6/2003 | Doetsch et al. ............. 375/341 |
| 2002/0176482 | A1 | * | 11/2002 | Chien ......................... 375/132 |

* cited by examiner

*Primary Examiner*—David C. Payne
*Assistant Examiner*—Vineeta S Panwalkar
(74) *Attorney, Agent, or Firm*—Sterne, Kessler, Goldstein & Fox P.L.L.C.

(57) ABSTRACT

Typical communication systems operate with a single channel decoder, and hence would have to settle for the performance from the single channel decoder regardless of the conditions of the communications channel. The present invention uses a hybrid channel decoder comprising multiple channel decoders, each configured to optimize the quality of the re-constructed signal for different channel conditions. Therefore, the desired decoder can be selected as conditions of the communications channel, or the data signal, change over time, so as to optimize the re-constructed data signal. In embodiments, the data signal is a speech signal.

31 Claims, 6 Drawing Sheets

Communication System

FIG. 3: Example of benefit from hybrid decoding

APPARATUS AND METHOD FOR HYBRID DECODING

CROSS REFERENCE TO RELATED APPLICATIONS

This Application claims the benefit of U.S. Provisional Application No. 60/541,258, filed on Feb. 4, 2004, which is incorporated herein by reference in its entirety.

BACKGROUND OF THE INVENTION

1. Field of the Invention

The present invention describes a method for hybrid decoding in a communication system.

2. Background

Typical communication systems operate with a single channel decoder in the receiver, and hence would have to settle for the performance from the single channel decoder regardless of the conditions of the communications channel. For instance, communication channel conditions can change over time due to channel fading, interference, etc., and a single channel decoder cannot adapt to these changing channel effects. Accordingly, data reception, whether it be voice, video, image communication or data transmission, can suffer.

Therefore, what is needed is a communications system that is configured to compensate for changing channel conditions.

BRIEF SUMMARY OF THE INVENTION

The present invention describes a method for hybrid decoding in a communication system, so as to improve the quality of a re-constructed source signal at the receiver of the communication system. In example embodiments, the method is applied to different types of source signals including: a speech signal, a video signal, or an image signal The method can also be applied to data communications, or any other type of communications, as long as there is a redundancy involved or the characteristics/quality of the channel is known.

The hybrid channel decoder comprises multiple channel decoders.

A single source decoder receives a decoded bit-stream from the hybrid channel decoder and produces a re-constructed source signal at the output of the source decoder. Each of the channel decoders is configured to so as optimize the quality of the re-constructed source signal for different channel conditions, or data conditions. Each channel decoder operates at a common bit rate. Therefore, a preferred channel decoder can be selected as conditions of the communications channel change over time, so as to optimize the quality of the re-constructed source signal.

The hybrid channel decoder can be implemented in a closed-loop configuration or an open-loop configuration. In the open-loop configuration, the preferred channel decoder is selected based on known information regarding the channel conditions and/or characteristics, such as estimates of channel metrics like carrier-to-interference ratio. In the closed-loop configuration all of the multiple decoders process the received bit-stream, and the corresponding decoded bit-streams are evaluated. A preferred bit-stream corresponding to the highest quality for the reconstructed source signal is selected. This selection can be based on redundancy in the signal. Finally, the hybrid decoder could be implemented in a combination of open-loop and closed-loop.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
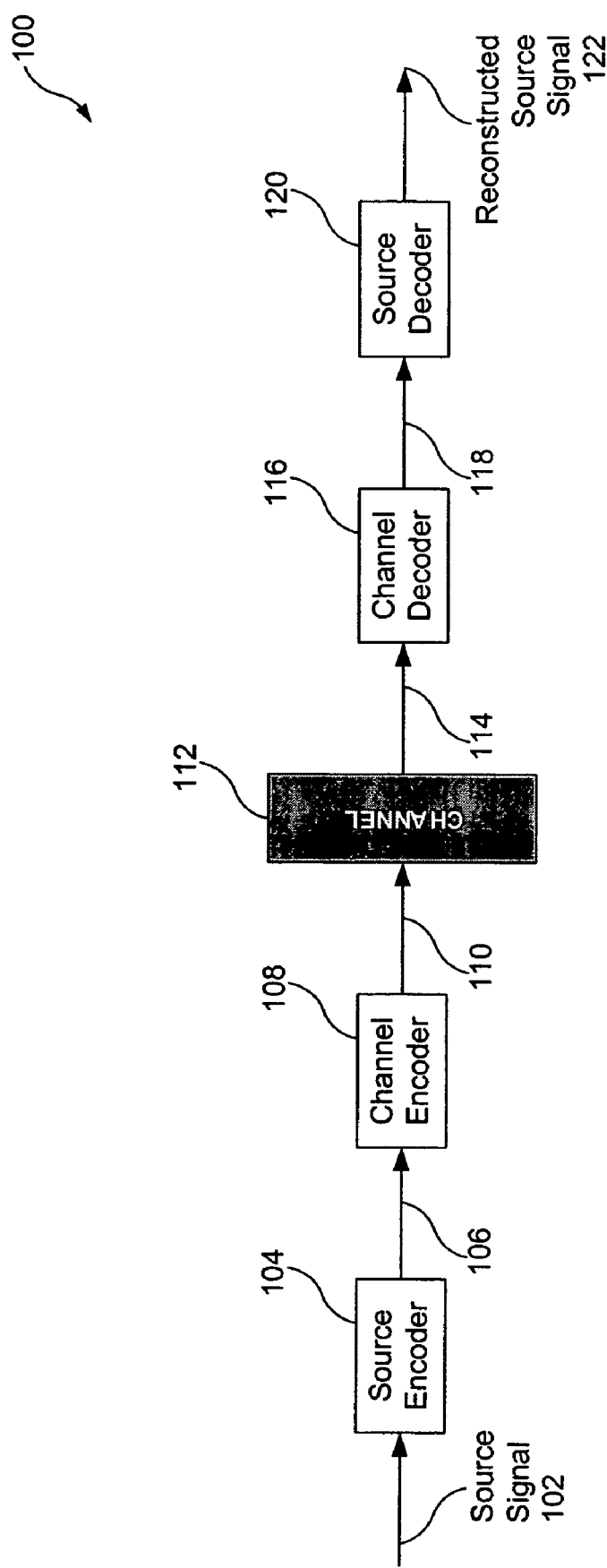
FIG. 1 illustrates a communications system.

FIG. 1 illustrates a transmission system 100, where source signal 102 is encoded prior to channel transmission, and then decoded to form re-constructed source signal 122. In embodiments of the invention, the source signal 102 includes any one, or a combination of the following: a speech signal, an image signal, a video signal, a data signal, or other type of signal. Specifically, transmission system 100 includes source encoder 104, channel encoder 108, communications channel 112, channel decoder 116, and source decoder 120. The operation of the transmission system 100 is described below.

The source encoder 104 encodes the source signal 102 into a bit-stream 106, and the channel encoder 108 adds redundancy to the bit-stream 106, typically using forward error correcting codes to generate a bit-stream 110 for transmission. This enables the channel decoder 116 to recover from certain errors to the received bit-stream 114 that are caused by the transmission over the channel 112, producing a corrected bit-stream 118. Knowing the forward error correcting code, the channel decoder 116 decodes the received bit-stream 114 to the best of its ability attempting to recover the bit-stream 106 passed from the source encoder 104 to the channel encoder 108. Finally, the source decoder 120 decodes the bit-stream 118 from the channel decoder 116 to produce the re-constructed source signal 122.

The quality of the re-constructed source signal 122 depends on the intrinsic quality of the source encoder 104 and source decoder 120, as well as the capability of the forward error correcting code of the channel encoding 108. Naturally, the condition of the channel has an impact as well. In good channel conditions the signal quality will generally be better, and in poor channel conditions it will be worse. Given the source encoder 104 and decoder 120, and the forward error correcting code of the channel encoder 108, freedom exists to perform the channel decoding 116 in a multitude of ways.

For instance, Viterbi decoding is used to determine the most likely transmitted bits. By taking additional information into account, methods can be derived to improve the channel decoding. Such information could be any redundancy in the bit-stream, or redundancy in the source signal parameters, or redundancy in the source waveform itself. Hence, multiple channel decoders can be designed to decode the same bit-stream.

Figure 2:
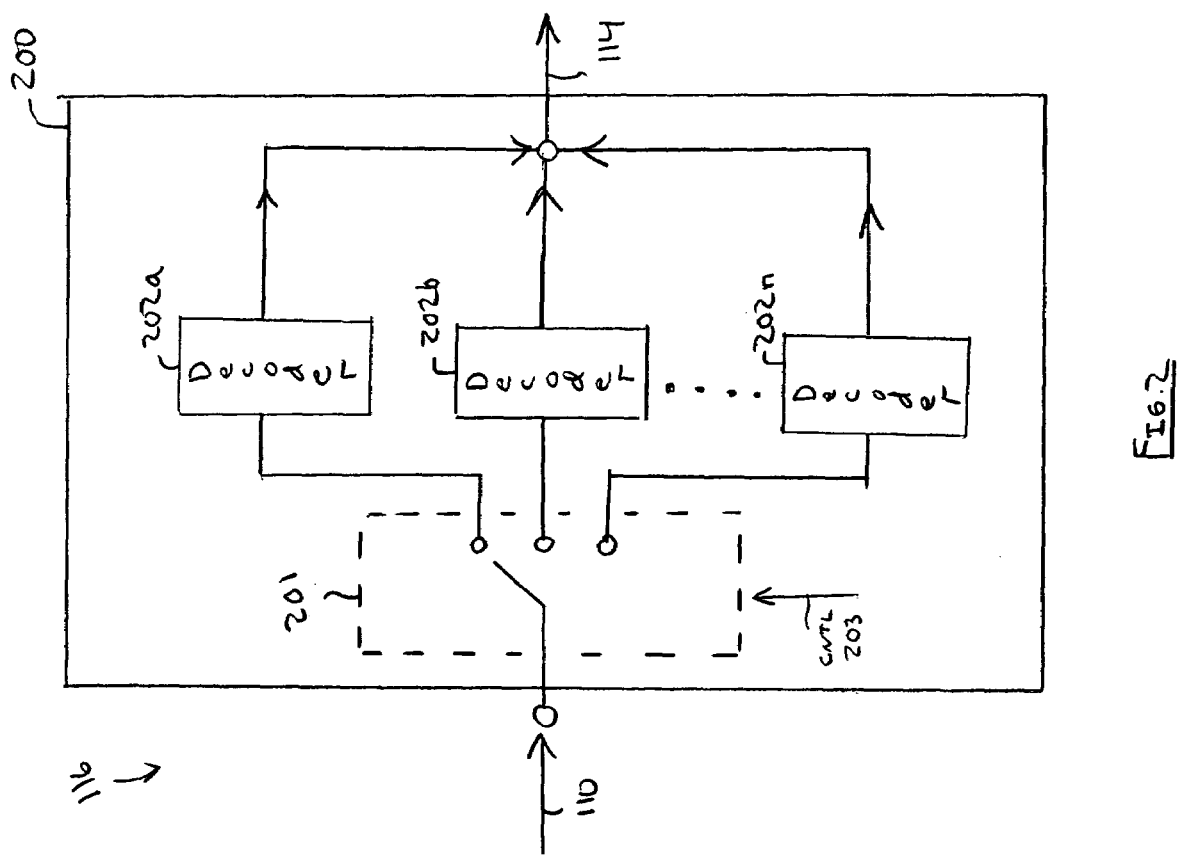
FIG. 2 illustrates an open-loop hybrid decoder according to embodiments the present invention.

For instance, FIG. 2 illustrates a channel decoder 200 that is one embodiment of the channel decoder 116. The channel decoder 200 includes multiple channel decoders 202a-n that are optimized for different channel conditions. Each of the channel decoders 202 behaves differently for different channel conditions and characteristics, one performing better under some conditions, a second under other conditions, a third under yet different conditions, etc. Consequently, under the first channel conditions, the first channel decoder 202a would produce the best re-constructed signal quality, while under the second channel conditions, the second channel decoder 202b would produce the best re-constructed signal quality, etc. However, each channel decoder operates at a common bit rate for the different channel conditions. Any number of channel decoders 202a-n could be used depending on the specific application, as will be understood by those skilled in the arts. Representative switch 201 selects the appropriate decoder 202 to decode the incoming bit-stream 114, so as to produce the decoded bit-stream 118. The representative switch 201 is controlled by a control signal 203. The switch 201 need not be limited to hardware, but could be implemented in software or some other means. Preferably, the switch would typically be implemented in software, as opposed to hardware.

Figure 3:
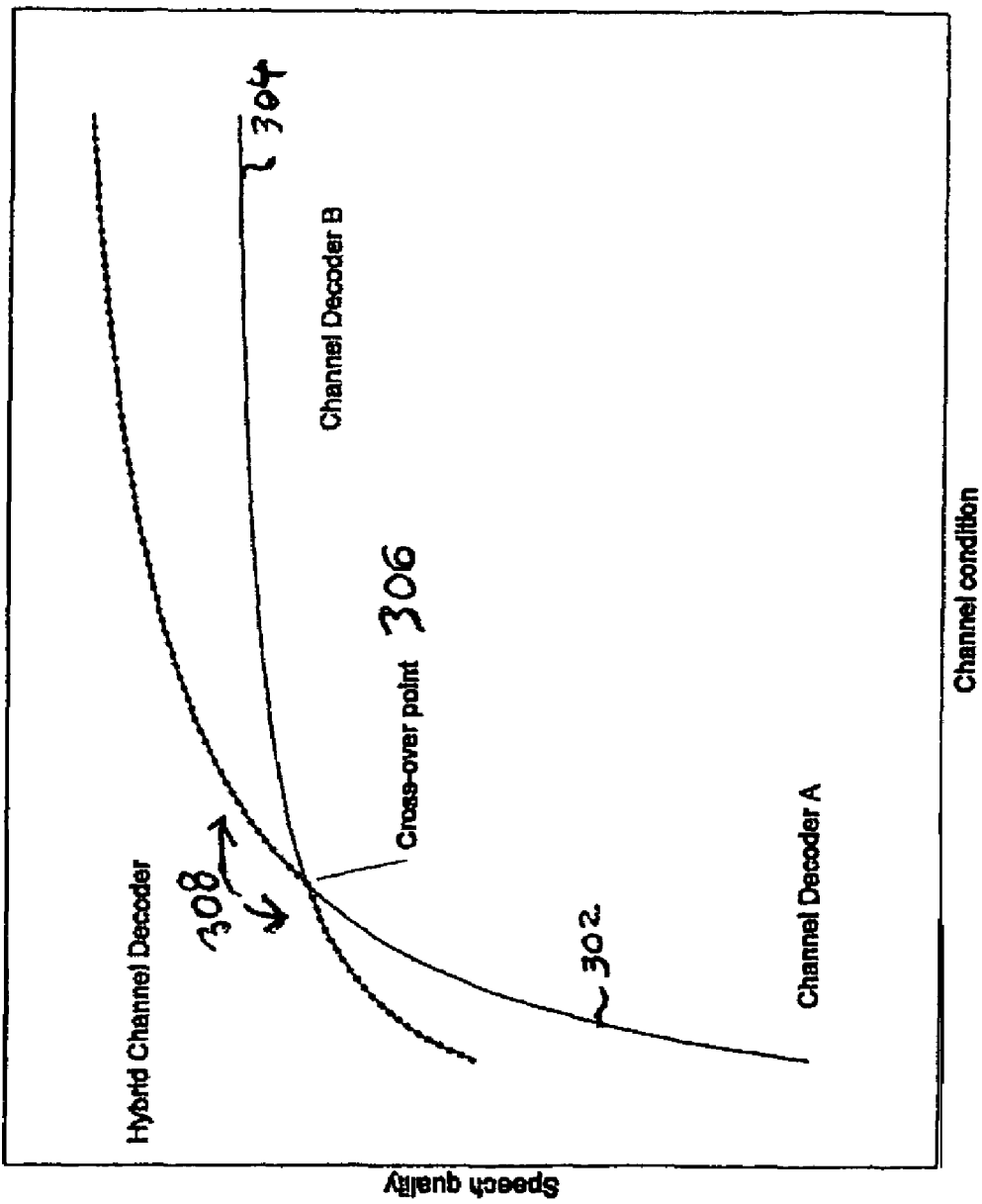
FIG. 3 illustrates the operation and benefit from hybrid decoding according to embodiments of the present invention.

FIG. 3 further illustrates the performance of the hybrid decoder 200 with two channel decoders 202a and 202b, for example. Channel decoder 202a results in a reconstructed signal quality as a function of channel condition given by the curve 302, and channel decoder 202b results in a reconstructed signal quality as a function of channel condition given by the curve 304.

Typical communication systems operate with a single channel decoder, and hence would have to settle for either the performance of channel decoder 202a or channel decoder 202b. The present invention uses the hybrid channel decoder 200 that includes multiple channel decoders. In the present example, the hybrid channel decoder 200 includes channel decoder 202a and channel decoder 202b and adaptively selects either channel decoder 202a or channel decoder 202b.

Channel decoder 202a is preferred and selected above the "cross-over point" 306 because it provides higher reconstructed signal quality above the cross-over point 306. Channel Decoder 202b is preferred and selected below the "cross-over point" 306 because it provides high re-constructed signal quality below the cross-over point. Therefore, the combination of channel decoder 202a and 202b provides superior performance over varying channel conditions than that obtained if only one of the channel decoders were used individually. This is illustrated by the dotted curve 308 in FIG. 3 that uses the combination of channel decoder 202a and 202b, to show the performance that is available by using the hybrid decoder.

The invention is illustrated by the example in FIG. 2 with two channel decoders. However, it applies to an arbitrary number of channel decoders, as will be understood by those skilled in the arts based on the discussion given herein.

The adaptive selection between multiple channel decoders 202 in the hybrid channel decoder 200 can be performed in either a closed loop or open loop manner, or a combination thereof. In the open-loop configuration, only the preferred channel decoding is performed, where the preferred channel decoding is being selected based on other information identifying the cross-over point(s), e.g. a channel condition measure. FIG. 2 illustrates the open-loop manner, where the switch 201 is controlled by the control signal 203 that is generated based on the channel conditions. The outputs of FIG. 2 are wire-ored together because only one decoder 202 will be activated based on the control signal 203. In other words, the outputs of decoders 202a-n are connected together because only one decoder receives an input and thus only one decoder is operable at a given time.

Figure 4:
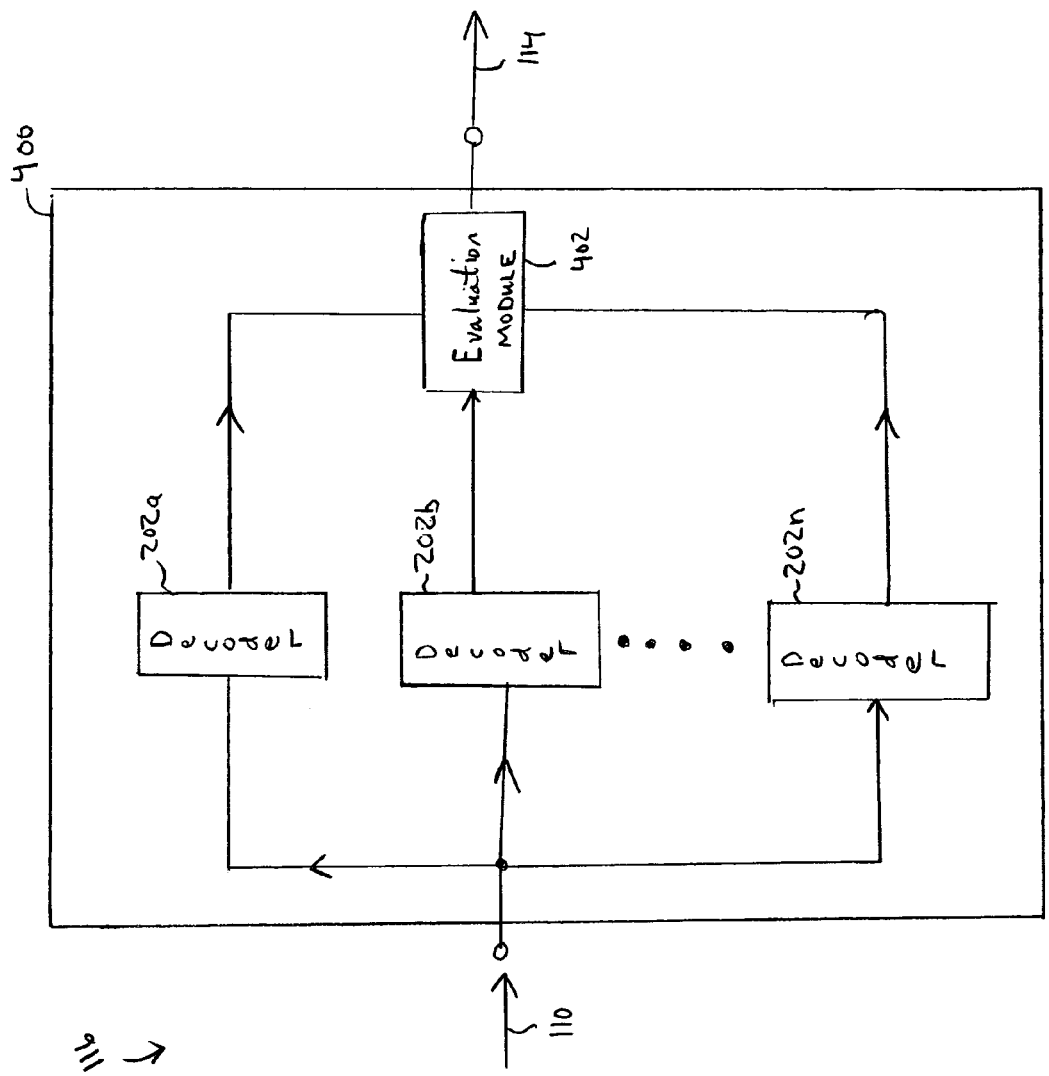
FIG. 4 illustrates a closed-loop decoder according to embodiments of the present invention.

FIG. 4 illustrates a closed-loop channel decoder 400 according to embodiments of the present invention. In a closed-loop configuration, multiple channel decodings are performed, and based on the multiple results, the preferred channel decoding is selected. For instance, channel decoders 202a-n decode the received bit-stream 110 in parallel, to produce a number of outputs that are evaluated by the evaluation module 402. As in FIG. 2, the multiple channel decoders 202 operate at a common bit rate. The evaluation module 402 examines the quality of the decoded outputs from the decoders 202a-202n, and selects the decoded output that produces the highest quality for the re-constructed source signal 122 at the output of the source decoder module 120. Typically, in evaluation module 402, the redundancy of the signal will be exploited to aid the identification of the decoder output that provides the highest quality re-constructed source signal. For example, speech signals inherently include redundancies associated with the waveform, which can be detected and utilized. Furthermore, parameters associated with the source signal typically exhibit redundancy that can be exploited to aid in the identification of the best decoder output to use.

The closed loop manner may carry a higher complexity with the advantage of possibly providing a more accurate selection of the channel decoder, while the open loop manner typically is less complex. The open-loop approach requires that the channel conditions be known beforehand, typically in form of estimates of channel metrics like the carrier-to-interference ratio. Whereas, the closed-loop approach requires no prior knowledge but instead relies on redundancy of the signal. Furthermore, it should be noted that a combination of open-loop and closed-loop hybrid decoding is possible providing a combination of the two.

Figure 5:
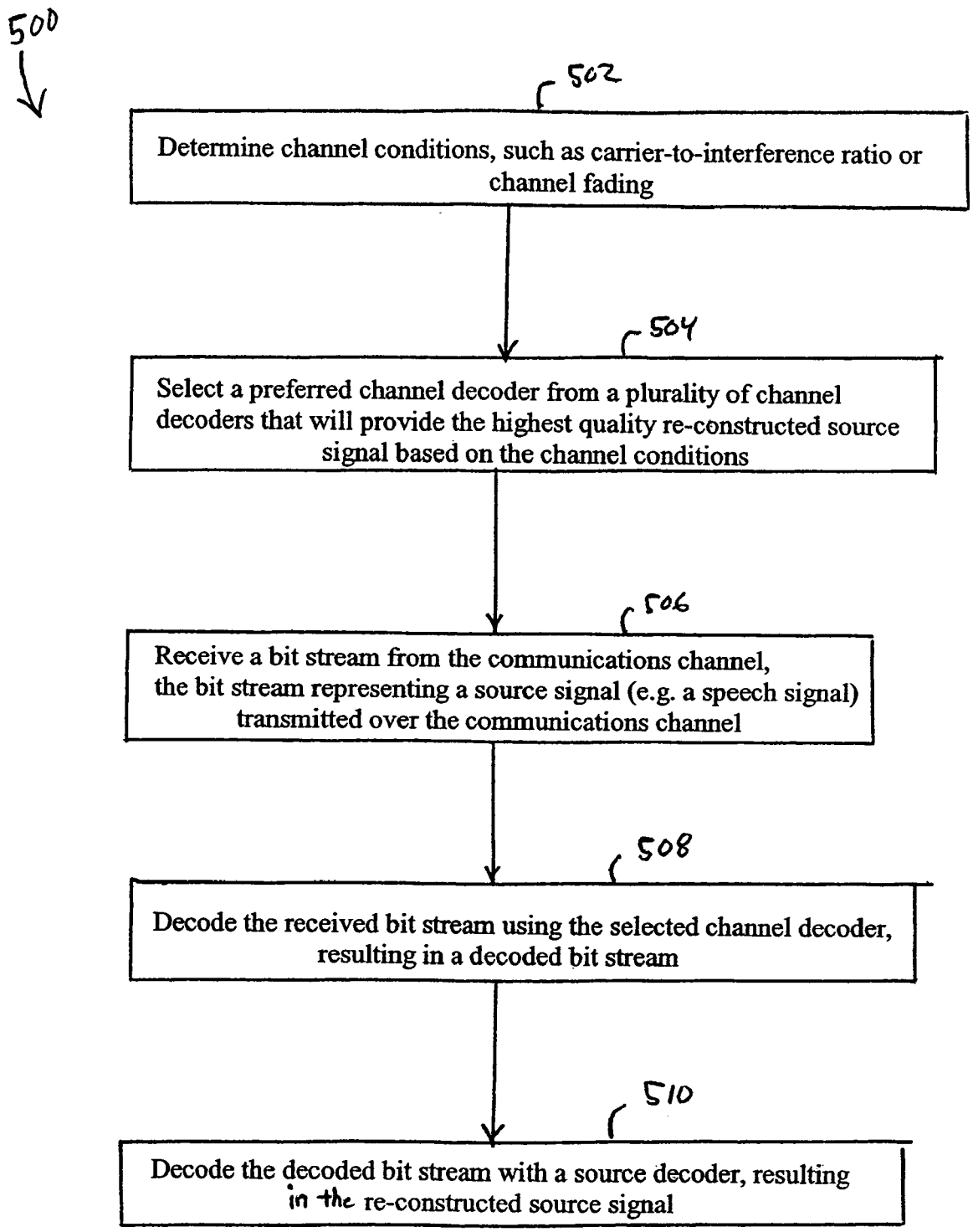
FIG. 5 illustrates a flowchart 500 of open-loop hybrid operation, according to embodiments of the present invention.

FIG. 5 is a flowchart 500 that further illustrates the open-loop decoder operation, including both channel decoding and source decoding for completeness. In step 502, channel conditions are determined prior to channel decoder selection. The channel conditions can include such performance characteristics of the channel such as carrier-to-interference ratio (also known as C/I ratio), and/or channel fading. In step 504, a preferred channel decoder is selected from the multiple channel decoders 202 based on the channel conditions. In other words, a channel decoder 202 is selected that will provide the best reconstruction for the re-constructed source signal 122 given the specific channel conditions that are determined in step 502. In step 506, a bit-stream is received over the communications channel 112. The bit-stream represents the source signal transmitted over the communications channel and could include for example, encoded speech. In step 508, the received bit-stream is decoded using the channel decoder selected in step 506. In step 510, the decoded bit-stream is further decoded using the source decoder 120, resulting in the re-constructed source signal 122. As discussed above, the channel decoder selected in step 502 was determined so as to provide the highest quality re-constructed source signal 122, for the given channel conditions.

Figure 6:
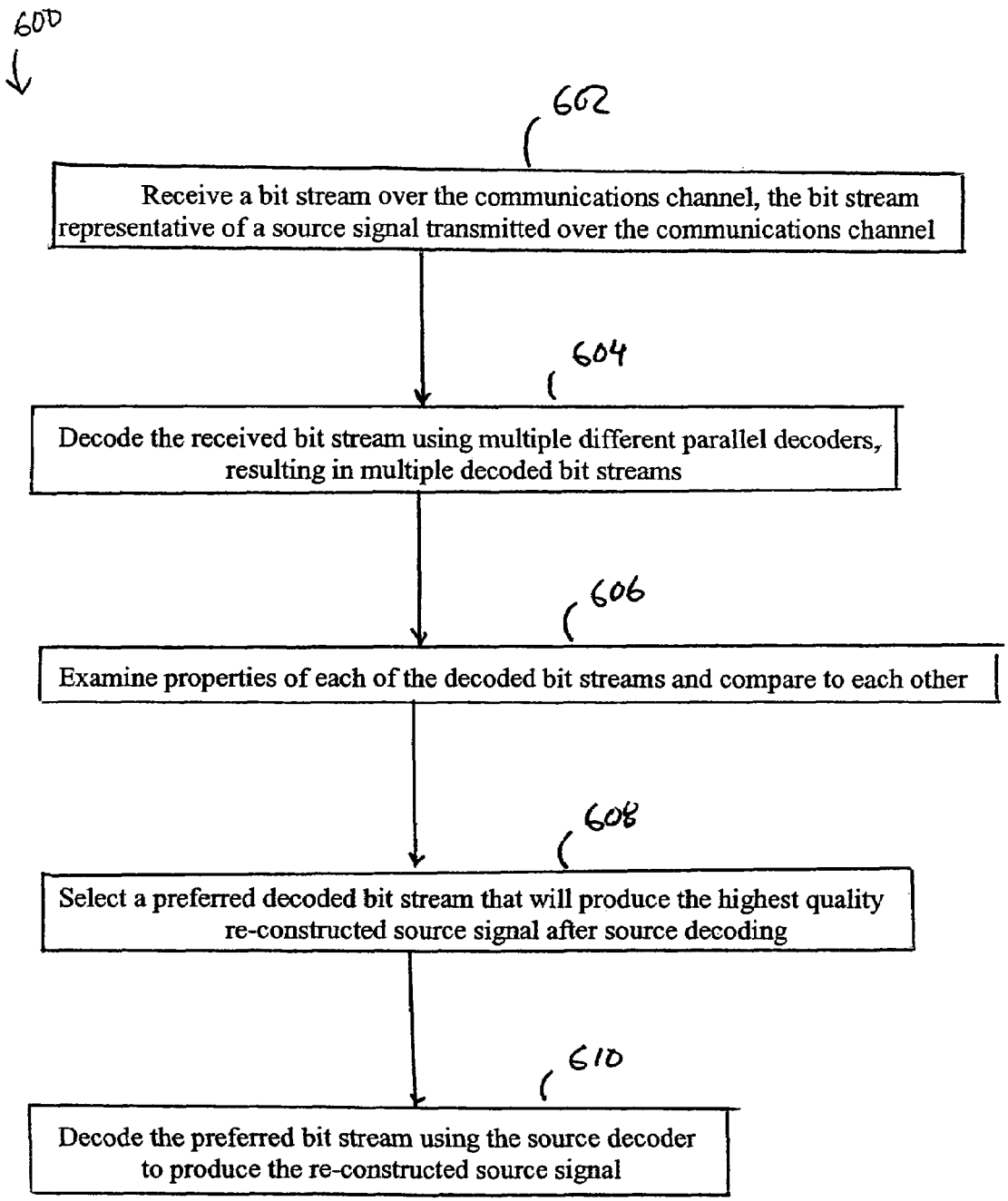
FIG. 6 illustrates a flowchart 600 of closed-loop hybrid operation, according to embodiments of the present invention.

FIG. 6 is a flowchart 600 that further illustrates the closed loop hybrid decoder approach, including both channel decoding and source decoding for completeness. In step 602, data is received over a communications channel. The data includes a bit-stream corresponding to an encoded source signal, for example, encoded speech. In step 604, the received bit-stream is decoded using multiple channel decoders 202 in parallel to produce corresponding multiple decoded bit-streams, where each channel decoder is configured for differing channel conditions. For example, one decoder 202 may be configured for high carrier-to-interference ratio (i.e. high quality channel) and another decoder 202 may be configured for low carrier-to-interference ratio (i.e. low quality channel). In step 606, the properties of the decoded bit-streams are examined and compared to each other in order to identify a preferred decoded bit-stream. For example, redundancy of the source signal may be exploited to aid in selecting the decoded bit-stream that provides the highest quality for the reconstructed source signal. The redundancy could be inherent to the source signal in the form of knowledge of how parameters or waveforms of the source signal behave, or it could be added at the encoder side in the form of redundant information, such as parity bit(s). In step 608, the decoded bit-stream is selected that provides the highest quality of the reconstructed source signal 122. In step 610, the decoded bit-stream that is selected in step 608 is further decoded using the source decoder 120 to produce the re-constructed speech signal 122.

The invention proposed applies to any communication system that can exploit redundancy in the underlying signal that needs to be transmitted, or to any communication system where knowledge of the channel condition is known or can be estimated at the receiving side (the decoder). For example, the underlying signal can be speech, image or video, or a data communication signal where the data has redundancy. The redundancy in data can be intrinsic or can be extrinsically introduced, for example by adding parity bits to data using an error detecting code.

The representative signal processing functions described herein (e.g. channel and source decoders, etc.) can be implemented in hardware, software, or some combination thereof. For instance, the signal processing functions can be implemented using computer processors, computer logic, application specific circuits (ASIC), digital signal processors, etc., as will be understood by those skilled in the arts based on the discussion given herein. Accordingly, any processor that performs the signal processing functions described herein is within the scope and spirit of the present invention.

Further, the signal processing functions described herein could be embodied by computer program instructions that are executed by a computer processor or any one of the hardware devices listed above. The computer program instructions cause the processor to perform the signal processing functions described herein. The computer program instructions (e.g. software) can be stored in a computer usable medium, computer program medium, or any storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the signal processing functions described herein are within the scope and spirit of the present invention.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A hybrid decoder for decoding a bit-stream received over a communications channel, said bit-stream representative of a source signal that is transmitted over said communications channel, comprising:
    a first channel decoder, configured to be coupled to said communications channel;
    a second channel decoder, configured to be coupled to said communications channel;
    said first channel decoder being a first type, and configured for a first condition of said communications channel;
    said second channel decoder being a second type, and configured for a second condition of said communications channel; and
    wherein said first type is different from said second type and wherein said first channel decoder and said second channel decoder have a common bit rate.

2. The hybrid decoder of claim 1, wherein said first channel decoder is selected when said first condition exists in said communications channel.

3. The hybrid decoder of claim 1, wherein said second channel decoder is selected when said second condition exists in said communications channel.

4. The hybrid decoder of claim 1, wherein said source signal is one of: a speech signal, an image signal, a video signal, and a redundant signal.

5. The hybrid decoder of claim 1, wherein said first channel decoder or said second channel decoder is selected based on a waveform associated with said bit-stream.

6. The hybrid decoder of claim 1, wherein said first channel decoder or said second channel decoder is selected based on a redundancy of said bit-stream.

7. The hybrid decoder of claim 1, wherein said first channel decoder and said second channel decoder are among a plurality of channel decoders.

8. The hybrid decoder of claim 7, wherein a source decoder receives an output from said plurality of channel decoders and produces a re-constructed source signal at an output of said source decoder, wherein one of said channel decoders is selected so as to optimize quality of said re-constructed source signal at said output of said source decoder.

9. A hybrid decoder for decoding a bit-stream received from a communications channel, said bit-stream representative of a source signal that is transmitted over said communications channel, comprising:
    a plurality of channel decoders, each channel decoder configured to decode said received bit-stream based on a different condition of said communications channel, wherein a first of said plurality of channel decoders is a first type, a second of said plurality of channel decoders is a second type, and said first type is different from said second type and wherein said first of said plurality of channel decoders and said second of said plurality of channel decoders have a common bit rate;
    wherein one of said channel decoders is selected to provide a decoded bit-stream of said received bit-stream based on a first condition of said communications channel.

10. The hybrid decoder of claim 9, wherein another of said channel decoders is selected to provide said decoded bit-stream based on a second condition of said communications channel.

11. The hybrid decoder of claim 9, wherein said selected one of said channel decoders is determined based on a known condition of said communications channel.

12. The hybrid decoder of claim 9, wherein said plurality of channel decoders each decode said received bit-stream in parallel to produce a corresponding plurality of said decoded bit-streams, wherein a preferred decoded bit-stream is selected from said plurality of decoded bit-streams and sent to a source decoder that generates a re-constructed source signal based on said preferred decoded bit-stream, said preferred decoded bit-stream selected to produce the highest quality re-constructed source signal at an output of said source decoder.

13. The hybrid decoder of claim 12, wherein said preferred decoded bit-stream is selected based on a redundancy within said decoded bit-streams.

14. The hybrid decoder of claim 13, wherein said redundancy is based on parameters related to said source signal or based on a waveform of said source signal.

15. The hybrid decoder of claim 12, wherein said preferred decoded bit-stream is selected by examining one or more parity bits of said decoded bit-streams.

16. An open-loop method of decoding a bit-stream received over a communications channel, said bit-stream representative of a source signal transmitted over said communications channel, the method comprising:
  determining channel conditions of said communications channel prior to decoding said received bit-stream;
  selecting a preferred channel decoder from multiple channel decoders based on said channel conditions, wherein a first of said multiple channel decoders is a first type, a second of said multiple channel decoders is a second type, and said first type is different from said second type and wherein said first of said multiple channel decoders and said second of said multiple channel decoders have a common bit rate;
  decoding said received bit-stream using said preferred channel decoder, resulting in a decoded bit-stream; and
  decoding said decoded bit-stream using a source decoder to produce a re-constructed source signal, wherein said preferred channel decoder is selected to provide the highest quality for said re-constructed source signal for said channel conditions.

17. The method of claim 16, wherein said step of determining channel conditions includes:
  determining a quality of said communications channel.

18. The method of claim 17, wherein said step of determining includes one of the following:
  determining a carrier-to-interference ratio of said communications channel; and
  determining fading of said communications channel.

19. A closed-loop method of decoding a bit-stream received over a communications channel, said bit-stream representative of a source signal transmitted over said communications channel, comprising:
  decoding said received bit-stream using multiple channel decoders, each of said multiple channel decoders configured for a different channel condition of said communications channel, resulting in multiple decoded bit-streams, wherein a first of said multiple channel decoders is a first type, a second of said multiple channel decoders is a second type, and said first type is different from said second type and wherein said first of said multiple channel decoders and said second of said multiple channel decoders have a common bit rate;
  examining said multiple decoded bit-streams;
  selecting a preferred decoded bit-stream from said multiple decoded bit-streams; and
  decoding said preferred decoded bit-stream using a source decoder to produce a re-constructed source signal, said preferred decoded bit-stream selected to provide the highest quality for said re-constructed source signal when compared with that of other decoded bit-streams.

20. The method of claim 19, wherein the step of selecting includes examining a redundancy within said received decoded bit-streams.

21. The method of claim 20, wherein said redundancy is based on parameters related to said source signal or based on a waveform of said source signal.

22. The method of claim 19, wherein each of said multiple channel decoders is configured to optimize the quality of said re-constructed source signal for a different channel condition.

23. A hybrid decoder for decoding a bit-stream received over a communications channel, said bit-stream representative of a source signal that is transmitted over said communications channel, comprising:
  a first channel decoder configured to be coupled to said communications channel;
  a second channel decoder configured to be coupled to said communications channel;
  said first channel decoder configured for a first condition of said communications channel;
  said second channel decoder configured for a second condition of said communications channel; and
  wherein said first channel decoder and said second channel decoder have a common bit rate and wherein when said bit-stream is a common input to said first channel decoder and said second channel decoder, a decoded output of said second channel decoder is different from a decoded output of said first channel decoder.

24. The hybrid decoder of claim 1, wherein a carrier-to-interference ratio provides a measure of each of the first condition and the second condition.

25. The hybrid decoder of claim 1, wherein a measure of a fading of said communications channel provides a measure of each of the first condition and the second condition.

26. The hybrid decoder of claim 9, wherein a carrier-to-interference ratio provides a measure of each said different condition.

27. The hybrid decoder of claim 9, wherein a measure of a fading of said communications channel provides a measure of each said different condition.

28. The method of claim 19, wherein a carrier-to-interference ratio provides a measure of each said different channel condition.

29. The method of claim 19, wherein a measure of a fading of said communications channel provides a measure of each said different channel condition.

30. The hybrid decoder of claim 23, wherein a carrier-to-interference ratio provides a measure of each of the first condition and the second condition.

31. The hybrid decoder of claim 23, wherein a measure of a fading of said communications channel provides a measure of each of the first condition and the second condition.

* * * * *